G. A. & J. F. BOLAS.
TOWING AND BRAKE APPLYING CONNECTION FOR VEHICLE TRAILERS.
APPLICATION FILED NOV. 28, 1917.
1,294,608.
Patented Feb. 18, 1919.
2 SHEETS—SHEET 1.
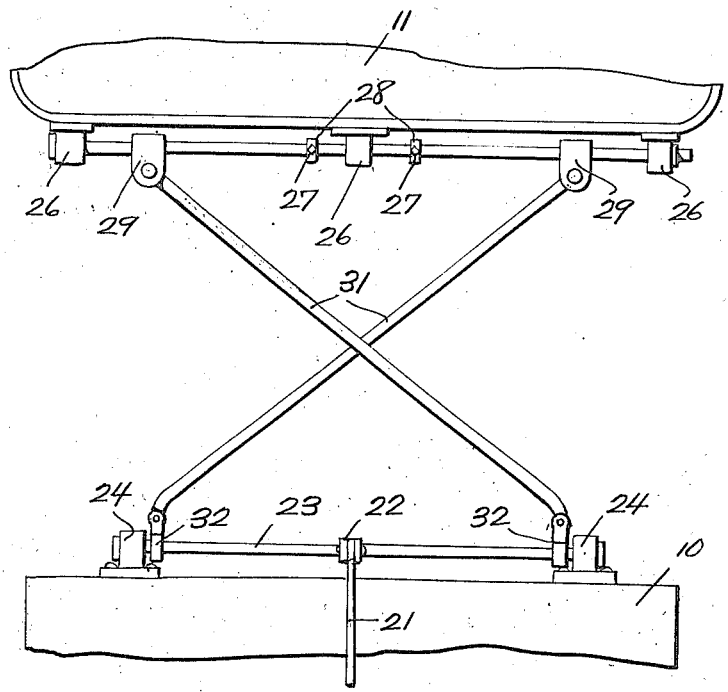
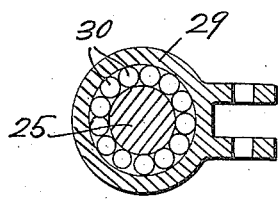
WITNESSES
INVENTOR
George A. Bolas and
John F. Bolas,
ATTORTEY G. A. & J. F. BOLAS.
TOWING AND BRAKE APPLYING CONNECTION FOR VEHICLE TRAILERS.
APPLICATION FILED NOV. 28, 1917.

1,294,608.

Patented Feb. 18, 1919.
2 SHEETS—SHEET 2.

WITNESSES
G. Hennery
Ross J. Woodward

INVENTOR
George A. Bolas, and
John F. Bolas,
Richard Bowen,
ATTORNEY

UNITED STATES PATENT OFFICE.

GEORGE A. BOLAS, OF ROSALIE, NEBRASKA, AND JOHN F. BOLAS, OF FORT RILEY, KANSAS.

TOWING AND BRAKE-APPLYING CONNECTION FOR VEHICLE-TRAILERS.

1,294,608. Specification of Letters Patent. Patented Feb. 18, 1919.

Application filed November 23, 1917. Serial No. 204,436.

*To all whom it may concern:*

Be it known that we, GEORGE A. BOLAS and JOHN F. BOLAS, citizens of the United States, residing at Rosalie and Fort Riley, respectively, in the counties of Thurston and Geary and States of Nebraska and Kansas, have invented certain new and useful Improvements in Towing and Brake-Applying Connections for Vehicle-Trailers, of which the following is a specification.

This invention relates to an improved towing device for connecting a trailer with an automobile or other vehicle and the principal object of the invention is to provide improved means for connecting the trailer with the vehicle so that the trailer will accurately follow the vehicle and to further so construct this connection that the brakes may be applied to the trailer when the automobile or main vehicle is brought to a stop and the brakes released when the automobile is again started forwardly.

Another object of the invention is to so construct this connection that the application of the brakes will be automatic, movement of the trailer toward the main vehicle or automobile causing the brakes to be applied and movement of the vehicle from the trailer causing the brakes to be released.

This invention is illustrated in the accompanying drawings, wherein:—

Figure 2:
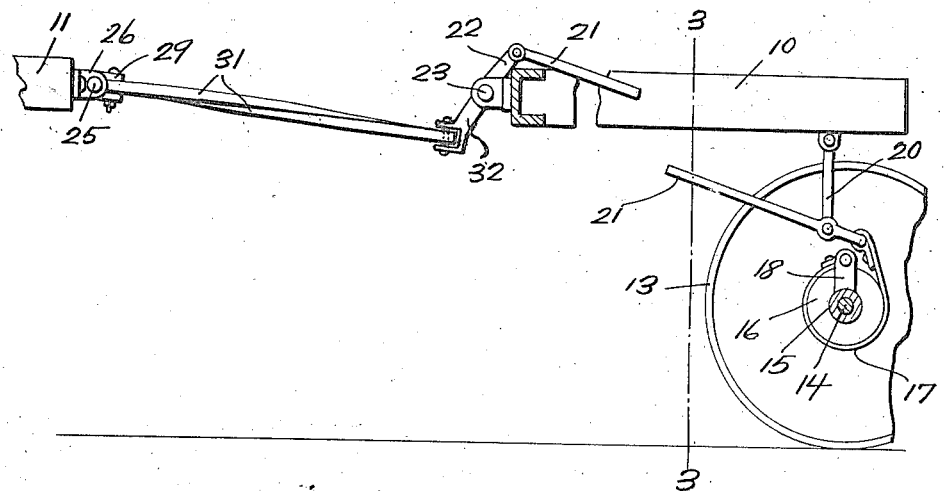
Figure 3:
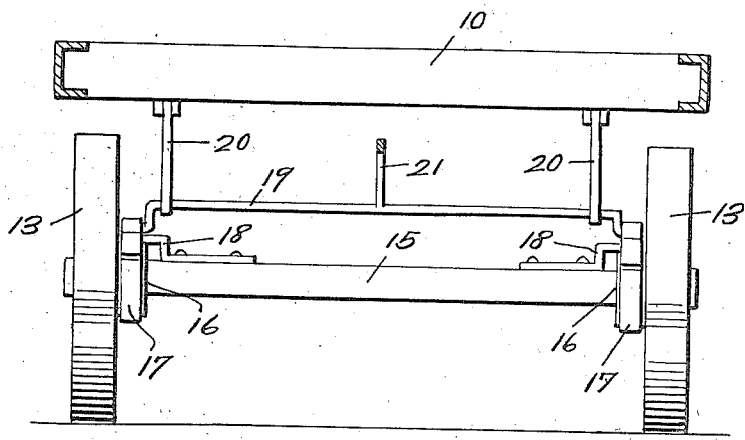

Figure 1 is a plan view of the improved connection, portions of the automobile and trailer being shown, Fig. 2 is a view of the connection and a portion of the automobile and trailer, the view being shown partially in side elevation and partially in section, Fig. 3 is a view taken along line 3—3 of Fig. 2, and, Fig. 4 is an enlarged sectional view through one of the sliding bearings forming part of the invention.

This towing device is used for connecting the trailer 10 with the automobile 11, the automobile and the trailer being of a conventional construction and the trailer being provided with supporting wheels 13 mounted upon an axle 14 positioned in an axle casing 15. The wheels are provided with the brake hubs 16 about which extend the brake bands 17, the inner ends of which will be engaged by the anchors 18 mounted upon the axle casing. The brake rod 19, the ends of which are connected with the brake bands 17, is suspended beneath the trailer by means of the hangers 20 and is provided with an extension or lever 21 leading forwardly and connected with the arm 22 of the rocker shaft 23. It will thus be seen that when the rocker shaft is rotated in its bearing 24, to move the arm 22 forwardly, the draw bar 21 will be drawn forwardly and the brake rod or yoke 19 thus moved to draw the brake bands about the brake drums 16 and apply the brakes.

A shaft 25 is mounted in bearings 26 carried by the automobile and carries abutment collars 27 adjustably held thereon through the medium of set screws 28. This rod also carries bearing brackets 29 slidably mounted and provided with bearing balls 30 as shown in Fig. 4 thus permitting easy movement. Links or rods 31 are pivotally connected at their forward ends with the bearing brackets 29 and extend in cross relation as shown in Fig. 1 and have their rear end portions pivotally connected with the arms 32 rigidly mounted upon the rocker shaft 23. As these arms 32 are rigidly mounted, it will be readily seen that when the automobile slows or comes to a stop and the trailer moves forwardly under the impulse of its momentum, the arms 32 will move to rotate the shaft 23 thus drawing upon the draw bar 21 and as previously explained causing the brakes to be applied. When the automobile moves forwardly, the arms 32 will be swung forwardly and the lever arm 22 will be swung rearwardly thus moving the bar 21 to release the brakes. This will cause the brakes to be automatically applied when the automobile stops and will at the same time cause the brakes to be released when the automobile again starts and will further prevent any danger of the brakes being applied when not desired. This construction would be especially useful when traveling over roads having a number of hills, as the brakes would be automatically applied when going down a hill thus preventing the trailer from following too close upon the automobile. By having the bearings 29 slidably mounted upon the rod or shaft 25, these bearings may move inwardly and outwardly when the trailer moves toward or away from the automobile. This sliding and the pivotal connection between the rod 31 and the bearings 29 further assists in keeping the trailer position behind the automobile when traveling along a road or when making a turn as the rod can have the proper movement.

We have thus provided a towing structure so constructed that a trailer may be drawn behind an automobile and kept in the proper position and further so constructed that the brakes may be released or applied to the trailer wheels when necessary without any attention whatever of the driver of the automobile.

What is claimed is:—

1. A towing vehicle, a trailer having a body, an axle casing, an axle in the casing, brake hubs upon the axle, and supporting wheels upon the axle, anchors mounted upon the axle casing, hanger brackets connected with the body, a rocker shaft connected with the body, a yoke carried by the hanger brackets, brake bands connected with the anchors and with the yoke, a draw bar extending from the yoke, an arm extending from the rocker shaft and pivotally connected with the draw bar, a shaft connected with the towing vehicle, lever arms extending from the rocker shaft, bearings slidably mounted upon the shaft of the towing vehicle, and connecting bars pivotally connected with the sliding bearings and extending in cross relation and pivotally connected with the lever arms.

2. The combination of a towing vehicle, a trailer, a rock shaft mounted upon the forward end of the trailer, cross connecting rods slidably and pivotally secured at their rear ends to the towing vehicle, the opposite ends of said rods being pivotally secured to said rock shaft to impart rotary movement thereto.

3. The combination of a towing vehicle, a shaft mounted on the rear end thereof, a trailer, a shaft mounted on the forward end of said trailer and opposing said first mentioned shaft, arms rigid with the trailer shaft, cross connecting rods pivoted at their rear ends to said arms and having their forward ends slidably and pivotally connected to said first mentioned shaft.

In testimony whereof we affix our signatures in presence of two witnesses.

GEORGE A. BOLAS.
JOHN F. BOLAS.

Witnesses:
J. M. SHULENBERGER,
J. GERALD MACLEIGH.